United States Patent

[11] 3,566,230

[72] Inventor Samuel J. Mac Mullan
Flourtown, Pa.
[21] Appl. No. 706,973
[22] Filed Feb. 20, 1968
[45] Patented Feb. 23, 1971
[73] Assignee Leeds & Northrup Company
Philadelphia, Pa.

---

[54] ELECTRONIC COUNTERS
14 Claims, 5 Drawing Figs.

[52] U.S. Cl. .......................................... 318/341, 307/225, 307/241, 328/48
[51] Int. Cl. .......................................... H02p 7/28
[50] Field of Search .......................................... 318/138, 341; 307/292, 221, 222, 225; 328/37, 44, 42, 48, 49; 307/241, 225, 292; 328/48

[56] References Cited

UNITED STATES PATENTS

| | | | |
|---|---|---|---|
| 3,320,590 | 5/1967 | Rovell .......................... | 307/241X |
| 3,275,849 | 9/1966 | Coates, Jr. et al. ........... | 307/292X |
| 3,312,835 | 4/1967 | Grasmuck .................... | 307/225 |
| 3,393,366 | 7/1968 | Shoop .......................... | 307/225X |

OTHER REFERENCES

Millman and Taub, " Pulse, Digital, and Switching Waveforms," N.Y. McGraw-Hill, 1965, p.676

*Primary Examiner*—Oris L. Rader
*Assistant Examiner*—Robert J. Hickey
*Attorney*—Woodcock, Washburn, Kurtz & Mackiewicz

---

ABSTRACT: Electronic counter at least in part comprising a variable modulus portion having unilateralized feedback circuitry to make available a multiplicity of discrete pulse-repetition frequencies for operation of a motor at correspondingly different constant speeds.

ELECTRONIC COUNTERS

BACKGROUND OF THE INVENTION

Electronic speed changers have the advantage of permitting speed-changing from a remote location but the fidelity with which electronic speed changers produce a desired output speed is inferior to that obtained with a synchronous motor having gear-changing provisions. A prime weakness of previous approaches to electronic speed-changing is that excessive cumulative error arises because of susceptibility of the speed-changer circuitry to electrical "noise" due, for example, to effect of electrical fields.

SUMMARY OF THE INVENTION

In accordance with the present invention, as applied to speed-changing of a motor, pulses of reference frequency are used as trigger pulses for a binary counter having feedback circuits selectively enabled to provide a multiplicity of discrete frequencies any one of which may be selected for operation of a motor at corresponding speed. The feedback-enabling circuitry includes means to minimize the undesired effects of noise pickup by the enabling lines and the feedback circuits are each unilateralized by inclusion of a diode and transistor in the feedback path between flip-flops of the counter. The selectable output lines from the counter stages may also be provided with means to minimize the undesired effects of noise pickup by those lines.

More specifically, each of the feedback paths from the output terminal of a later stage flip-flop to the reset terminal of an earlier stage flip-flop to the reset includes in series a capacitor, a diode and the emitter-collector paths of a transistor whose base is connected to the circuit common or ground. A feedback enabling/disabling switch, or equivalent, selectively determines the DC bias potential provided at the junction of the diode and capacitor of each feedback path.

The invention further resides in features of combination and arrangement hereinafter described and claimed.

BRIEF DESCRIPTION OF THE DRAWINGS

For a more detailed understanding of the invention, reference is made in the following description of a specific embodiment thereof the attached drawings in which.

DESCRIPTION OF PREFERRED EMBODIMENTS

Figure 1:
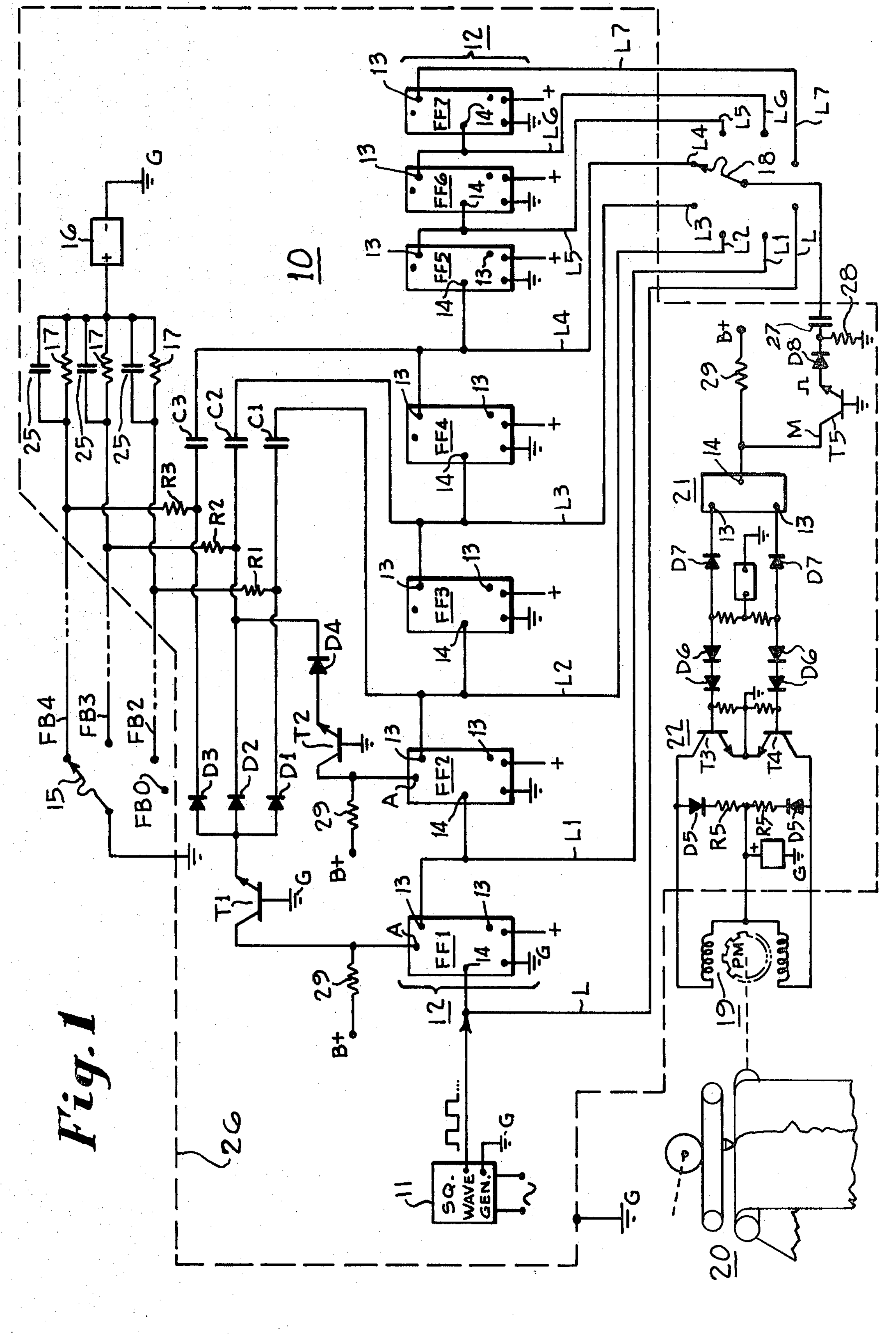
FIG. 1, partly schematic and partly in block, is a circuit diagram of a pulse-frequency selector system as used for speed control of a motor.

In the electronic-frequency selector 10 shown in FIG. 1 of the drawings, a square wave generator 11 provides input pulses of fixed repetition frequency for the digital counter 12. Pulse generator 11 may be of known type in which, for example, AC from a power line is rectified or clipped to produce square wave output pulses. Each of the cascaded stages FF1 et seq. of the counter 12 may be a flip-flop or bistable trigger circuit of known type which normally produces one output pulse for each two successive pulses applied to its input terminal 14.

In the particular selector system shown, there are provided three feedback circuits for resetting of the first stage FF1 of the counter from the outputs of subsequent stages and one feedback circuit for resetting of the second stage FF2 from a later stage. Each of the feedback paths includes a capacitor, a diode and the collector-emitter path of a transistor connected in series between the output terminal 13 of a later stage and the reset terminal A of an earlier stage. Since three of the feedback paths are to the first stage FF1, a single transistor T1, common to these three feedback paths, may be used instead of three separate transistors.

Specifically, the output terminal 13 of the second stage FF2 of counter 12 is connected to one side of capacitor C1 and a diode D1 is connected between the other side of capacitor C1 and one of the output electrodes, specifically the emitter of transistor T1. The other output electrode of transistor T1 is connected to the reset terminal A of the first stage flip-flop FF1 of counter 12. The base of transistor T1 is connected to the circuit common or ground G. The output terminals 13 of the third and fourth stage flip-flops FF3,FF4 are similarly respectively connected to the emitter of transistor T1 via capacitor C2, diode D2 and capacitor C3, diode D3. The reset terminal A of the second stage flip-flop FF2 is connected to a capacitor C2 via the collector-emitter path of transistor T2 and diode D4. The base of transistor T2 is connected to the circuit common or ground G.

The three feedback enabling lines FB4, FB3, FB2 are respectively connected to the output side of capacitors C1,C2,C3 by the resistors R1,R2,R3. When any one of lines FB4,FB3,FB2 is connected to circuit common or ground G as by conductor 15, which may be a patch cord or the movable contact of a switch, the corresponding one of resistors R1,R2,R3 coacts with one of the associated capacitors C1,C2,C3 to form a differentiating network. The enabling switch, or equivalent, may be, and usually is, remote from counter 12 but the AC impedance between the enabled line and the circuit common or ground G is negligible.

When line FB4 is grounded, the feedback circuit from the fourth stage flip-flop FF4 is enabled for resetting of the first stage flip-flop FF1; when line FB3 is grounded, the feedback circuit from the third stage flip-flop FF3 is enabled for resetting of the first stage flip-flop FF1; and when the line FB2 is grounded, the feedback circuits from the third stage flip-flop FF3 are enabled for resetting of the first and second stage flip-flops FF1,FF2.

The resistors 17 connected between the groundable ends of resistors R1,R2,R3 and the ungrounded terminal of the DC supply source 16 are to limit the current drawn from source 16 when any one of the feedback circuits is enabled and so maintain a feedback-inhibiting potential applied by that source to the output side of the capacitors C1,C2,C3 of the feedback circuits which have not been enabled. The capacitors 25 in shunt to the limiting resistors 17 (as shown) or in shunt to the limiting resistors 17 and source 16 provided paths of low impedance to ground for noise picked up by the long feed back enabling lines FB4,FB3,FB2 or by the inductive loops formed by those lines and their ground return.

OPERATION WITH FEEDBACK FB4 ENABLED

For purpose of explanation, it is assumed that the flip-flops FF1 to flip-flops FF4 are in the binary states 0000 corresponding with the decimal count of 0 (see line 1 of TABLE 1 below) when the FB4 feedback is initially enabled.

TABLE 1
(FB4 Enabled)

| | Decimal equivalent | FF4 | FF3 | FF2 | FF1 |
|---|---|---|---|---|---|
| | 0 | 0 | 0 | 0 | 0 |
| Normal Cycle of Counter | 1 | 0 | 0 | 0 | 1 |
| | 2 | 0 | 0 | 1 | 0 |
| | 3 | 0 | 0 | 1 | 1 |
| | 4 | 0 | 1 | 0 | 0 |
| | 5 | 0 | 1 | 0 | 1 |
| | 6 | 0 | 1 | 1 | 0 |
| | 7 | 0 | 1 | 1 | 1 |
| | 8 | 1 | 0 | 0 | 0 |
| | 9 | 1 | 0 | 0 | 1 |
| | 10 | 1 | 0 | 1 | 0 |
| | 11 | 1 | 0 | 1 | 1 |
| | 12 | 1 | 1 | 0 | 0 |
| | 13 | 1 | 1 | 0 | 1 |
| | 14 | 1 | 1 | 1 | 0 |
| FB4 | 15 | 1 | 1 | 1 | 1 |
| | 1 | 0 | 0 | 0 | 1 |

For the first 15 input pulses applied to counter 12, the flip-flops FF1 to FF4 progress through the binary states respectively corresponding to the equivalent decimal counts 1 to 15 (see lines 2 to 16 of TABLE 1). In the absence of the enabled feedback circuit between FF4 and FF1, the application of the 16th input pulse would cause the flip-flops FF1 through FF4 to revert to their initial binary states having the equivalent decimal count of O. However, because of the enabling of feedback FB4, after the 1 to 0 transition has progressed through flip-flops FF1 to FF4, it is differentiated by the RC network R3,C3, and applied as a reset pulse to the first stage flip-flop FF1. Thus, application of the 16th pulse results in the binary states of flip-flops FF1 to FF4 which correspond to the equivalent decimal count of 1 (see line 17 of TABLE 1). Thereafter, so long as feedback FB4 remains enabled, the normal cycle of counter 12 repeats every 15 input pulses to the counter.

If feedback FB4 is initially enabled when the count stored in stages FF1 to FF4 is within the normal cycle of TABLE 1, the new cycle of operation will start with that count and proceed per TABLE 1.

Thus, as shown by TABLE 1A below, for each successive 15 input pulses applied to counter 12: eight, four and two pulses appear on output lines L1, L2, L3 respectively and one pulse appears on output line 4. The corresponding moduli available from the variable modulus portion of selector 12 (flip-flops FF1—FF4) are thus 1, 1.875, 7.5 and 15.

TABLE 1A

| | Number of 1 to 0 transitions per cycle of Counter | Modulus |
|---|---|---|
| Input | 15 | 1 |
| FF1 | 8 | [1] 1.875 |
| FF2 | 4 | [1] 3.75 |
| FF3 | 2 | [1] 7.5 |
| FF4 | 1 | 15 |

[1] Non-symmetrical time interval.

Reverting to the operation of the enabled feedback circuit C3,D3,D3,T1: when the 1 to 0 transition of the output of flip-flop FF4, as differentiated by the RC network R3,C3, goes sufficiently negative to forward-bias the base-emitter junction of transistor T1 and its series-diode D2, it is clamped to a small voltage approximately equal to the sum of the base-emitter voltage drop and the forward-voltage drop of the diode. This small clamping voltage is much less than the open-circuit pulse amplitude of the differentiating network. As a result, the rate of change of voltage ($dv$/dt) across the capacitor C3 is approximately equal to that of the output of FF4.

A current pulse having the value C $dv/dt$ will flow through capacitor C3 while the output of flip-flop FF4 completes its 1 to 0 transition. Since the collector current of transistor T1 must approximately equal its emitter current, substantial current may be drawn from terminal A of flip-flop FF1. If the current is in excess of that available from terminal A, the excess will be taken up as emitter-base overdrive. However, considerable overdrive is tolerable and flip-flop FF1 is protected from excess voltage because the voltage of terminal A is limited to the difference between the saturation voltages $V_{ce}$ and $V_{be}$ of transistor T1.

When the output of FF4 settles down, the feedback transistor cuts off reliably and so prevents voltage excursions at terminal A of flip-flop FF1 (due to internal switching in FF1) from placing an undesirable charge on capacitor C3. When the output of flip-flop FF1 goes from 0 to 1, the differentiating network R3,C3 provides a positive pulse which, however, is blocked by diode D3, so protecting the base-emitter junction of resistor T1 from reverse voltage breakdown.

OPERATION WITH FEEDBACK FB2 ENABLED

For purposes of explanation, it is now assumed that the flip-flops FF1—FF4 are in the binary states 0000 corresponding with the decimal count of 0 (line 1 of TABLE 2 below) when

TABLE 2

(FB2 Enabled)

| | Decimal equivalent | FF4 | FF3 | FF2 | FF1 |
|---|---|---|---|---|---|
| | 0 | 0 | 0 | 0 | 0 |
| | 1 | 0 | 0 | 0 | 1 |
| | 2 | 0 | 0 | 1 | 0 |
| FB2 | 3 | 0 | 0 | 1 | 1 |
| | 5 | 0 | 1 | 0 | 1 |
| | 6 | 0 | 1 | 1 | 0 |
| FB2 | 7 | 0 | 1 | 1 | 1 |
| Normal Cycle of Counter | | | | | |
| | 9 | 1 | 0 | 0 | 1 |
| | 10 | 1 | 0 | 1 | 0 |
| FB3 | 11 | 1 | 0 | 1 | 1 |
| | 13 | 1 | 1 | 0 | 1 |
| | 14 | 1 | 1 | 1 | 0 |
| | 15 | 1 | 1 | 1 | 1 |
| FB3 | 1 | 0 | 0 | 0 | 1 |

For the first three input pulses applied, flip-flops FF1—FF4 progress in conventional manner through the binary states respectively corresponding with the decimal counts 1, 2, 3 (lines 2—4 of TABLE 2). Upon application of the fourth pulse, the flip-flops FF1, FF2, FF3 are set respectively to 001 by the usual counter action, but the feedback FB2 resets FF1 to 1 so that the binary counts stored in flip-flops FF1 to FF4 correspond with the decimal count of 5 (line 5 of TABLE 2). Upon application of the next two input pulses, the counter operates in conventional manner successively to store the equivalent decimal counts 6,7 in flip-flops FF1—FF4 (lines 6 and 7 of TABLE 2). Upon application of the seventh pulse, the flip-flops FF1—FF4 are set respectively to 0001 by conventional counter action, but the feedback FB2 resets flip-flop FF1 to 1 so that the stored count of flip-flops FF1—FF4 has the decimal equivalent of 9 (line 8 of TABLE 2). For application of the two next input pulses, the counter operates in the usual manner successively to store equivalent decimal counts of 10 and 11 in flip-flops FF1—FF4 (lines 9 and 10 of TABLE 2). Upon application of the tenth pulse, the flip-flops FF1-—FF3 are set respectively to 001 by usual counter action, but the feedback FB2 resets flip-flop FF1 to 1 so that the stored counts of flip-flops FF1—FF4 have the decimal equivalent of 13 (line 11 of TABLE 2). For application of the next two input pulses, the counter 12 operates in the usual manner successively to store the equivalent decimal counts of 14 and 15 in flip-flops FF1—FF4 (lines 12 and 13 of TABLE 2). Upon application of the 13th input pulse, the flip-flops FF1—FF4 are set respectively to 0000, but the feedback FB2 reset flip-flop FF1 to 1 so that the stored counts of flip-flops FF1—FF4 have the decimal equivalent of 1 (line 14 of TABLE 2) as the first count in the next counter cycle. Thereafter, so long as feedback FB2 remains enabled, the normal cycle of selector 10, shown in TABLE 2, repeats for every 12 input pulses to the counter.

If feedback FB2 is initially enabled when the count stored in flip-flops FF1—FF4 is within the normal cycle of TABLE 2, the new cycle of operation picks up from that count and proceeds per TABLE 2 as above explained.

Thus, as shown by TABLE 2A below, for each successive 12 input pulses applied to the counter, eight, four and two pulses respectively appear on output lines L1,L2,L3 and one pulse appears on output line L4. The corresponding moduli available from the variable modulus portion of selector 10 are thus: 1, 1.5, 3, 6 and 12.

TABLE 2A

| | Number of 1 to 0 transitions per cycle of Counter | Modulus |
|---|---|---|
| Input | 12 | 1 |
| FF1 | 8 | [1] 1.5 |
| FF2 | 4 | 3 |
| FF3 | 2 | 6 |
| FF4 | 1 | 12 |

[1] Non-symmetrical time intervals.

Each time the 1 to 0 transition of the output of flip-flop FF2, as differentiated by the RC network R1,C1, goes sufficiently negative to forward-bias the base-emitter junction of transistor T1 and its series diode D1, it is clamped to a small voltage corresponding with the sum of the base-emitter drop and the diode forward-voltage drop. Again flip-flop FF1 is protected from excess voltage during reset although considerable current may be drawn from its reset terminal A. When the output of FF2 settles down, the feedback transistor T1 cuts off reliably and so prevents voltage excursions at terminal A of flip-flop FF1 (due to internal switching in FF1) from placing an undesirable charge on capacitor C1. When the output of FF2 goes from 0 to 1, the differentiating network R1,C1 provides a positive pulse which, however, is blocked by diode D1 so that the emitter junction of transistor T1 is protected from reverse voltage breakdown.

OPERATION WITH FEEDBACK FB3 ENABLED

As shown by TABLE 3 below, the normal cycle with feedback FB3 enabled repeats for every ten input pulses to the counter and the corresponding binary counts stored in flip-flops FF1—FF4 successively correspond with decimal counts 3 to 7 and 11 to 15 (lines 4 to 13 of TABLE 3).

TABLE 3
(FB3 Enabled)

| Decimal equivalent | | FF4 | FF3 | FF2 | FF1 |
|---|---|---|---|---|---|
| | 0 | 0 | 0 | 0 | 0 |
| | 1 | 0 | 0 | 0 | 1 |
| | 2 | 0 | 0 | 1 | 0 |
| | 3 | 0 | 0 | 1 | 1 |
| | 4 | 0 | 1 | 0 | 0 |
| Normal | 5 | 0 | 1 | 0 | 1 |
| Cycle of | 6 | 0 | 1 | 1 | 0 |
| Counter | 7 | 0 | 1 | 1 | 1 |
| FB3 | 11 | 1 | 0 | 1 | 1 |
| | 12 | 1 | 1 | 0 | 0 |
| | 13 | 1 | 1 | 0 | 1 |
| | 14 | 1 | 1 | 1 | 0 |
| FB3 | 15 | 1 | 1 | 1 | 1 |
| | 3 | 0 | 0 | 1 | 1 |

If the flip-flops FF1—FF4, when feedback FB3 is initially enabled, are in binary states corresponding with the decimal count of 0, 1 or 2 (lines 1, 2, 3, of TABLE 3), the next one or two pulses, by conventional counter operation brings the count stored in stages FF1—FF4 to the decimal equivalent of 3 (line 4 of TABLE 3).

For application of the next four input pulses, the counter 12 operates in the usual manner to store the equivalent decimal counts 4, 5, 6, 7 in flip-flops FF1—FF4 (lines 5 to 8 of TABLE 3). Upon application of the next input pulse, the flip-flops FF1—FF4 are set to 0001 respectively by conventional action, but flip-flop FF1 is reset to 1 by the feedback action of circuits C2,R2,D2,T1, and flip-flop FF2 is reset to 1 by the feedback action of circuits C2,R2,D4,T2 so that the binary count stored in flip-flops FF1—FF2 corresponds with the decimal count of 11 (line 9 of TABLE 3). For application of he next four input pulses, the counter 12 operates in conventional manner successively to store the equivalent decimal counts 12, 13, 14, 15 in fliplflops FF1—FF4 (lines 9 to 12 of TABLE 3.) Upon application of the next pulse, the flip-flops FF1—FF4 are set to 0000, but flip-flops FF1 and FF2 are reset by the feedback action to 1,1, so that the binary count stored in flip-flops FF1—FF3 corresponds with the decimal count of 3 (line 14 of TABLE 3) as the first count of the next cycle. Thereafter, so long as feedback FB3 remains enabled, the normal cycle of counter 12, as shown in TABLE 3, repeats every 10 input pulses.

If feedback FB3 is initially enabled when the count stored in FF1—FF3 is within the normal cycle of TABLE 3, the new cycle picks up at that count and proceeds per TABLE 3 as above explained.

Thus, as shown by TABLE 3A below, for each 10 successive pulses applied to the counter, six, four and two appear on output lines L1,L2,L3 respectively and one pulse appears on output line L4. The corresponding moduli available from the variable modulus portion of selector 10 are thus 1, 1.66, 2.5, 5 and 10.

TABLE 3A

| | Number of 1 to 0 transitions per cycle of Counter | Modulus |
|---|---|---|
| Input | 10 | 1 |
| FF1 | 6 | [1] 1.66+ |
| FF2 | 4 | [1] 2.5 |
| FF3 | 2 | 6 |
| FF4 | 1 | 10 |

[1] Non-symmetrical time interval.

Each time the 1 to 0 transition of the output of flip-flops FF3 (as differentiated by the RC network R2,C2) goes sufficiently negative to forward-bias the base-emitter junctions of transistors T1,T2 and their respective series-diodes D2,D4; the junctions are each clamped to a small voltage approximately equal to the sum of the base-emitter drop and the diode forward-voltage drop. Thus, flip-flops FF1 and FF2 are each protected from excess voltage during reset although considerable current may be drawn from its reset terminal A.

When the output of flip-flop FF3 settles down, the feedback transistors T1 and T2 cut off reliably and so prevent voltage excursions at terminal A of flip-flops FF1,FF2 (due to internal switching) from placing an undesirable charge on capacitor C2. When the output of flip-flop FF3 goes from 0 to 1, the differentiating network R2,C2 provides a positive pulse which, however, is blocked by diodes D1 and D2 from the base-emitter junctions of transistors T1,T2. These junctions are, therefore, protected from reverse voltage breakdown.

The value of each of capacitors C1,C2,C3 is chosen to provide adequate current for reset of FF1,FF2 by way of transistors T1,T2 upon application of a negative-going output signal from a flip-flop and the values of R1,R2,R3 are chosen to provide, with the chosen values of C1,C2,C3, a somewhat slower but sufficiently rapid charging time upon application of a positive-going output of a flip-flop. For a pulse repetition frequency of 60 pulses per second, suitable values for the resistors R1,R2,R3 and capacitors C1,C2,C3 are included in TABLE 4.

TABLE 4

| Resistors | Capacitors |
|---|---|
| R1, R2, R3: 100 kilohms | C1, C2, C3: 0.0033 microfarad. |
| 17: 10 kilohms | |
| R28: 330 ohms | 25: 0.1 microfarad. |
| R29: 1 kilohm | 27: 470 picofarad. |
| **Transistors** | **Flip-flops** |
| T1, T2, T5: 2N3415 (NPN type) | FF1–FF7: Motorola MC 845P. |

OPERATION WITH NO FEEDBACK

With none of the feedback circuits enabled, the counter 12 operates in conventional manner with a cycle of flip-flops FF1—FF4 repeating for every 16 input pulses (TABLE 5 below).

TABLE 5
(No Feedback)

| Decimal equivalent | | FF4 | FF3 | FF2 | FF1 |
|---|---|---|---|---|---|
| | 0 | 0 | 0 | 0 | 0 |
| | 1 | 0 | 0 | 0 | 1 |
| | 2 | 0 | 0 | 1 | 0 |
| | 3 | 0 | 0 | 1 | 1 |
| | 4 | 0 | 1 | 0 | 0 |
| | 5 | 0 | 1 | 0 | 1 |
| | 6 | 0 | 1 | 1 | 0 |
| Normal | 7 | 0 | 1 | 1 | 1 |
| Cycle of | 8 | 1 | 0 | 0 | 0 |
| Counter | 9 | 1 | 0 | 0 | 1 |
| | 10 | 1 | 0 | 1 | 0 |
| | 11 | 1 | 0 | 1 | 1 |
| | 12 | 1 | 1 | 0 | 0 |
| | 13 | 1 | 1 | 0 | 1 |
| | 14 | 1 | 1 | 1 | 0 |
| | 15 | 1 | 1 | 1 | 1 |
| | 0 | 0 | 0 | 0 | 0 |

Thus, as shown in TABLE 5A below, for each 16 input pulses to counter 12: eight pulses appear on selectable output line L1; four pulses appear on selectable output line L2; two pulses appear on selectable output line L3; and one pulse appears on selectable line L4. The corresponding moduli available from the variable modulus portion (FF1—FF4) of selector 10 are, therefore, 1, 2, 4, 8 and 16.

TABLE 5A

| | Number of 1 to 0 transitions per cycle of Counter | Modulus |
|---|---|---|
| Input: | 16 | 1 |
| FF1: | 8 | 2 |
| FF2: | 4 | 4 |
| FF3: | 2 | 8 |
| FF4: | 1 | 16 |

Having in mind that the switch contact, patch-board connector 15 or equivalent may selectively enable any one or none of the feedbacks FB2, FB3, FB4, and that the switch contact patch-board connector or equivalent may selectively connect any one of lines L1 to L7 to the line M of selector 10, the moduli available are listed in TABLE 6 below. (The last three flip-flop stages each divide by 2).

TABLE 6

Available Moduli

| Feedback | Input | FF1 | FF2 | FF3 | FF4 | FF5 | FF6 | FF7 |
|---|---|---|---|---|---|---|---|---|
| None | 1 | 2 | 4 | 8 | 16 | 32 | 64 | 128 |
| FB4 | 1 | [1] 1.875 | [1] 3.75 | [1] 7.5 | 15 | 30 | 60 | 120 |
| FB2 | 1 | [1] 1.5 | 3 | 6 | 12 | 24 | 48 | 96 |
| FB3 | 1 | [1] 1.66+ | 2.5 | 5 | 10 | 20 | 40 | 80 |

[1] Non-symmetrical time interval.

In ascending order, the moduli affording an integral or hold-number relationship between the frequency of the input pulses to selector 10 and the frequency of the pulses on output line M of selector 10 are therefore 1, 2, 3, 4, 5, 6, 8, 10, 12, 15, 16, 20, 24, 30, 32, 40, 48, 60, 64, 80, 96, 120, and 128. It is desirable that these moduli be used when the output pulses on line M, preferably after amplification, are for operation of a motor at speeds synchronized with respect to the reference frequency of generator 11 or its supply line.

The motor may be of any suitable stepping type and associated drive circuitry.

In the particular system shown in FIG. 1, the motor 19, suited to drive the chart of a recorder 20 at any of various constant speeds corresponding with the selected modulus, is of known stepping type having two field windings and a permanently magnetized rotor with pairs of poles (A. W. Haydon, Series 45100).

As used for energizing the field of motor 19, the output pulses on line M from the frequency selector 10 are amplified. Specifically in FIG. 1, they are supplied to a driver-amplifier whose output is applied to a power amplifier 22. The intervention of the driver and power-stage amplifiers effectively isolates the load current handling function from the motor drive logic of selector 10. The driver-amplifier 21 may be solid-state flip-flop whose dissipation requirement is no higher than any of the flip-flops of counter 12. Unlike driver amplifiers of the SCR type, the flip-flop amplifier 21 will not hang up with both output sides in the ON state.

The power transistors T3,T4 whose collector-emitter circuits respectively include the field coils of motor 19 are alternately switched to ON state by the push-pull output pulses of driver flip-flop 21. For each two successive pulses on input line M of flip-flop 21, a pulse appears on first one side and then the other of its two output lines.

The diode D5 and resistor R5 connected in series with each other across a corresponding one of the motor field coils form a network limiting the inductive kickback voltage occurring when the associated power transistor is switched to the OFF state, thus to protect the transistor from excessive voltage.

The diodes D6 provided in the base-emitter circuits of the power transistors T3,T4 are for providing a voltage-threshold for reliable cutoff.

The diodes D7 provided in the output circuits of the driver flip-flop 21 are for blocking the positive output level of driver 21.

With the speed-changing circuitry thus far described, with all components except the feedback-selector 15 or equivalent within a grounded enclosure 16, the capacitors 25 provide low-impedance AC paths to ground for noise picked up by the feedback enabling lines.

A similar arrangement using a voltage source, transistors, diodes, resistors and capacitors may be used to minimize noise picked up by lines L1 to L7 and M of the output selector 18. However, the preferred arrangement comprises capacitor 27, resistor 28, diode D8, transistor T5 and resistor 29. The base of transistor T5 is connected to ground and its collector-emitter path is connected in series with diodes D8 and capacitor 27 in the output line M. The resistor 28 of low value is connected at one end to ground and at its other end to the junction of capacitor 27 and diode D8. Resistor 29 is connected between the output electrode of transistor T5 and a voltage source (B+) of the same polarity and magnitude as that of driver stage 21; in fact, it may be the same source. Through resistor 29 is applied, in absence of a pulse, a back-bias for transistor T5 and the input diodes of driver 25. Upon application of a pulse of sufficient magnitude through the capacitor 27, transistor T5 and diode D8 become forward-biased; sufficient current is drawn through resistor 29 to remove the back-bias and so change the input state of the driver. Noise alone does not have sufficient energy to do so.

Further to enhance the immunity to noise picked up on the feedback-enabling lines FB4,FB3,FB2, the transistor T1,T2 and the internal reset diodes of flip-flops FF1 and FF2 may be similarly back-biased (in absence of a reset pulse) to a considerable amplitude from the reset threshold by resistors 29. As shown in FIG. 1, resistor 29 is connected between reset terminals A of flip-flops FF1 and FF2 and the source of voltage for the flip-flops or a voltage of the same polarity and magnitude.

Figure 2:
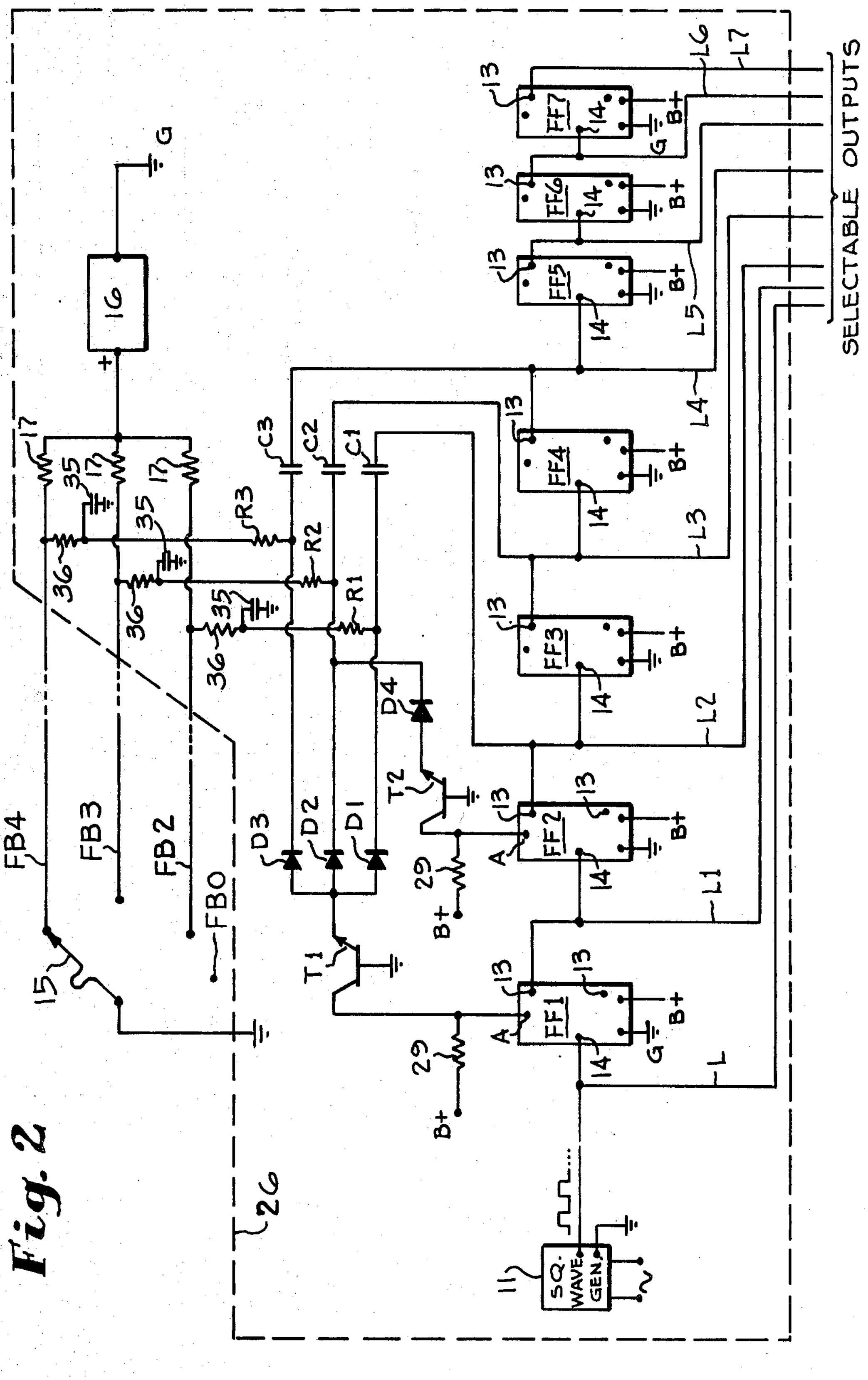
FIGS. 2 and 3 show selector systems similar to FIG. 1 with modifications of the feedback-enabling circuitry.

The selectable-modulus counter circuit of FIG. 2 is similar to that of FIG. 1 except for modification of the noise-immunizing circuitry for feedback enabling lines. Since components common to FGIS. 1 and 2 are therein identified by the same reference characters, it suffices here to discuss only the noise-immunizing circuitry of FIG. 2.

In FIG. 2, the feedback-enabling lines FB2,FB3,FB4 are respectively connected, within the shielding enclosure 26, to the differentiating circuit resistors R1,R2,R3 through a corresponding one of resistors 36 and are each connected to ground via a resistor 36 and a series-connected capacitor 35. Thus, each feedback-enabling line, so far as its noise pickup is concerned, is effectively isolated from the associated feedback circuitry by a filter section including the series-attenuator resistor 36 and a terminating capacitor 35 of low AC impedance. Each bypass capacitor 35 provides a virtual ground, for legitimate feedback pulses, at the node or junction between the associated filter resistor 36 and the enabling resistor (R1,R2,R3). A positive feedback pulse tends to charge the feedback capacitor (C1,C2 or C3), but overcharge is precluded because the pulse amplitude is effectively attenuated by a factor equal to the ratio of resistance 36 to the sum of resistances 36 and enabling resistance (R1,R2 or R3). A negative feedback pulse is clamped by the associated feedback transistor (or transistors) and its series diode and so cannot charge the feedback capacitor to any appreciable extent. Suitable values of components are: C1,C2,C3–470 picofarads: 35–0.1 microfarad: 36–10 kilohms: for other circuit values, see TABLE 4.

Figure 3:
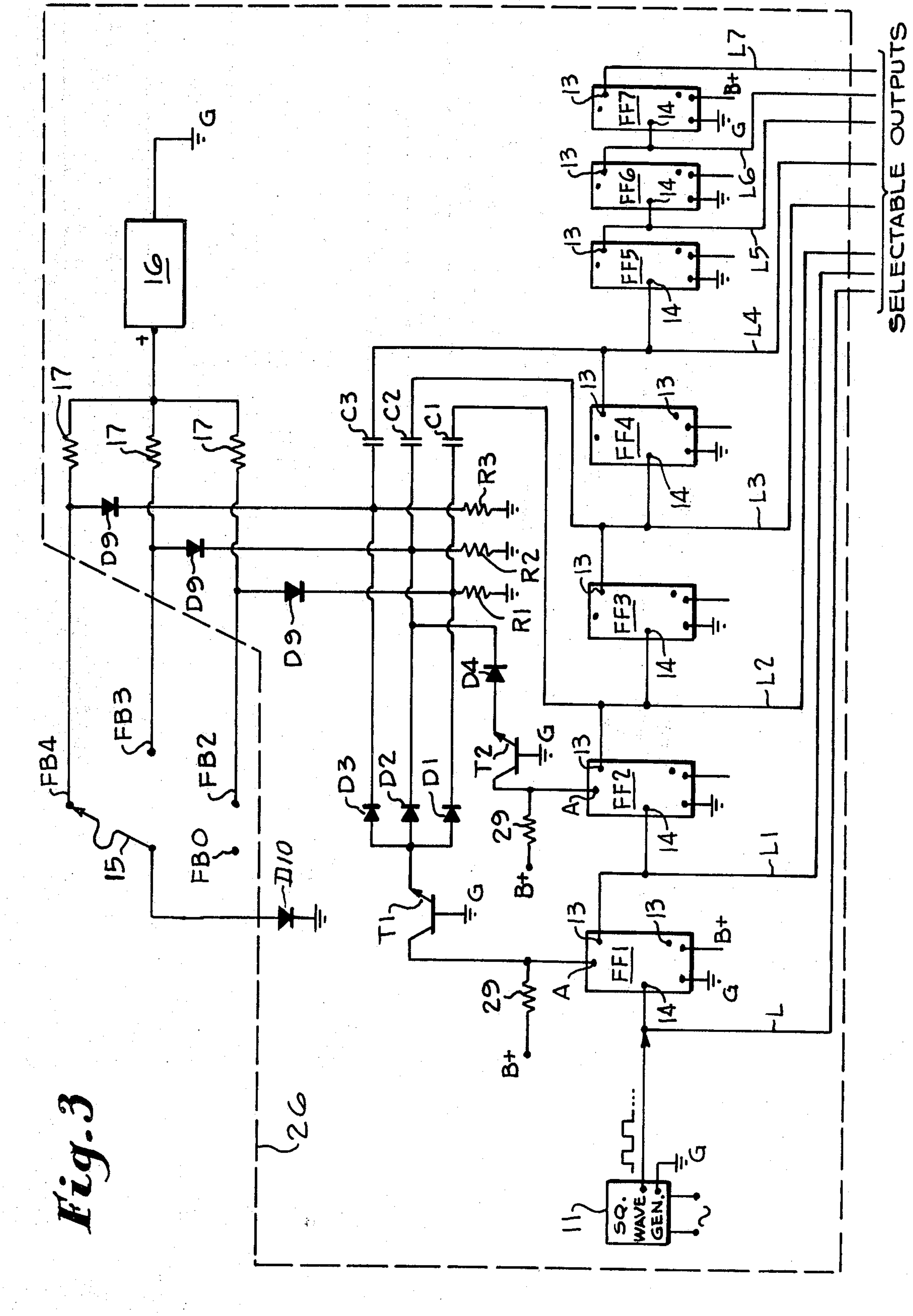

The selectable-modulus counter-circuit of FIG. 3 is also similar to that of FIG. 1 except for modification of the noise-immunizing circuitry for the feedback-enabling lines. Since components common to FIGS. 1 and 3 are therein identified by the same reference characters, it suffices here to discuss only the noise-immunizing circuitry of FIG. 3.

In FIG. 3, one end of each of the differentiating-circuit resistors R1,R2,R3 is connected directly and continuously to the circuit common or ground G. The other end of each of them is connected to the junction of the associated capacitor (C1,C2,C3) and diode (D1,D2,D3) of the corresponding feedback path, and such junction is connected to the associated feedback-enabling line (FB2,FB3,FB4) via a disabling diode D9. The blocking diode D10 connected between circuit common G and the movable contact of the enabling switch 15 prevents a pulse through the feedback capacitor (C1,C2,C3) from being shunted to circuit common via switch 15 instead of passing through the enabled feedback resistor (R1,R2,R3). For any nonenabled feedback path, the potential of the ungrounded end of its enabling resistance (R1,R2 or R3) is maintained at a potential fixed by the potential-divider formed by the current-limiting resistance 17 and the enabling resistance (R1,R2 or R3). If noise on an enabled line (FB1,FB2,FB3) drops the anode voltage of diode D9, a false feedback cannot occur because of the blocking action of diode D9. If noise on an enabled line substantially raises the anode voltage of diode D9, it could disable a legitimate feedback pulse; and if noise on a disabled line causes sufficient drop of the anode voltage of diode D1, it can result in a false feedback. For the latter two reasons, the least expensive arrangement of FIG. 3 is not the best for installation in very "-noisy" environments.

It is to be understood that if transistors used in the flip-flop circuits, feedback circuits and amplifier circuits of FIGS. 1, 2 and 3 are of the PNP type, the polarities of their DC supply source and of the diodes are reversed.

Figure 4:
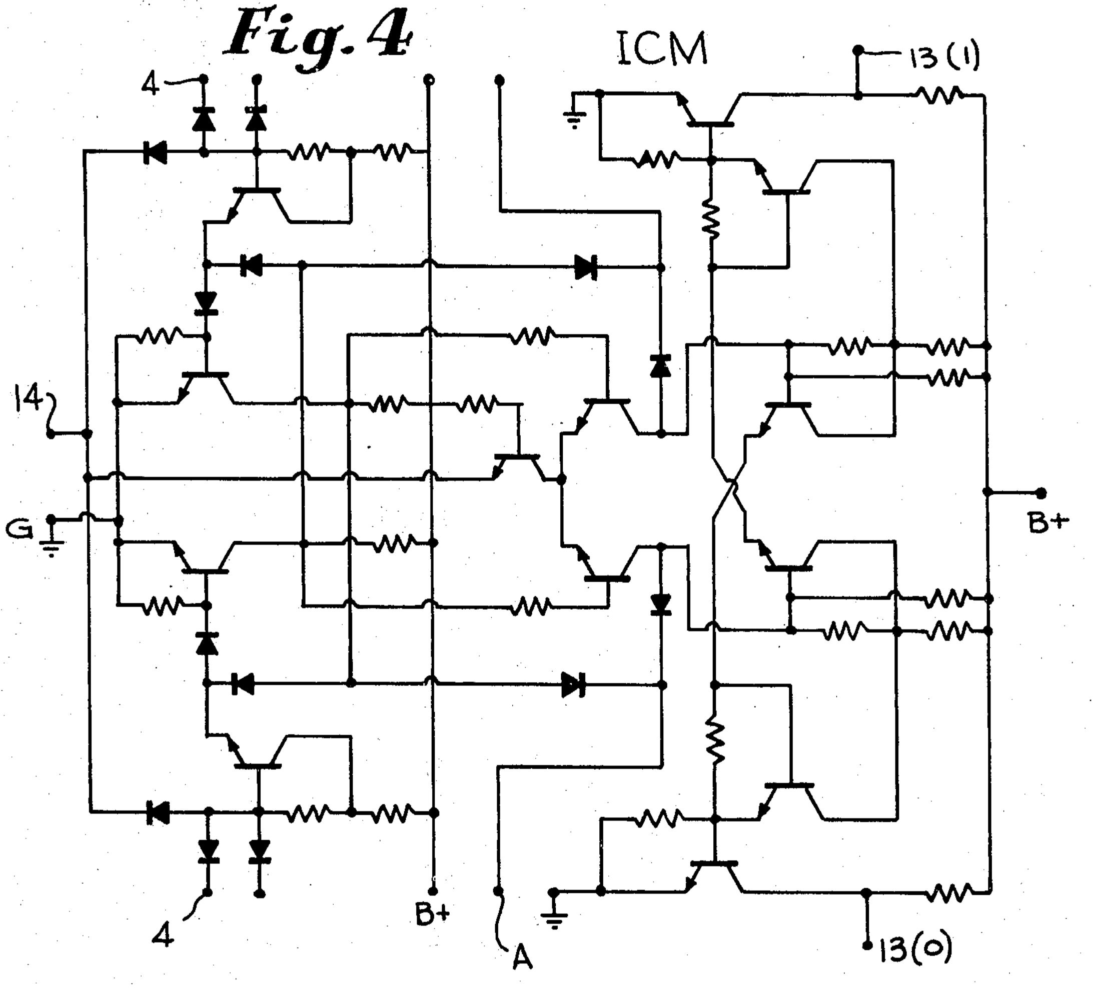
FIG. 4 is a schematic of an integrated circuit module.
Figure 5:
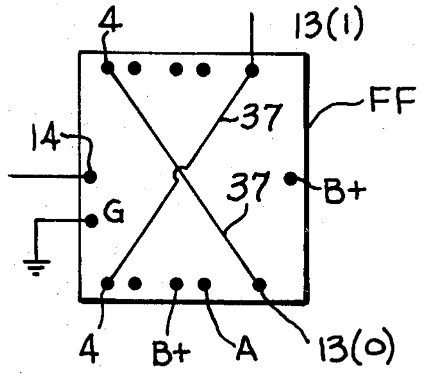
FIG. 5 shows the module of FIG. 4 en bloc with strap connections for its use as a flip-flop.

In all of FIGS. 1 to 3, the flip-flops used may each be a commercially available integrated circuit module ICM, such as Motorola MC 845P (FIG. 4) with selected input and output terminals strapped together (FIG. 5) by added conductors 37.

I claim:

1. A system providing for a multiplicity of pulse-repetition frequencies, said system including:
a source of reference frequency pulses;
a series of binary counter stages including flip-flops having reset terminals, the first of which is connected to receive said reference frequency pulses and the remainder of which are connected each to receive the output pulses of the preceding stage;
one or more enabled and noise immunized feedback circuits each effective, when enabled, to reset an earlier one of said stages from output pulses of a later stage and each comprising:
a capacitor;
a diode;
a transistor in grounded base configuration;
a resistance means; and
said capacitor, said diode, and the internal collector-emitter path of said transistor connected in series to form a feedback path, said transistor having its base connected to circuit common of the counter stages and its collector and emitter respectively connected to the reset terminal of the earlier counter stage and to one electrode of said diode, said capacitor connected between the other electrode of said diode and an output terminal of the later counter stage, said resistance means connected between said reset terminal and a voltage point providing a back-bias large enough to substantially prevent reset of said earlier counting stage by noise but small enough to permit reset by a reset pulse when the feedback circuit is enabled, and
an enabling-disabling circuit for each of said feedback circuits comprising:
a DC source; and
a conductive means selectively operable to disable the feedback circuit by application to the diode of a back-bias from said DC source and to enable the feedback circuit by removal of said bias.

2. A system as in claim 1 in which:
one terminal of the DC source is connected to the circuit common;
a feedback-enabling resistance is connected from one end to said other electrode of the diode and from the other end to another terminal of the DC source; and
said conductive means, for enabling of the feedback circuits, connects said other end of the feedback-enabling resistance to the circuit common.

3. A system as in claim 1 in which:
one terminal of the DC source is connected to the circuit common;
a feedback-enabling resistance is connected from one end to said other electrode of the feedback-circuit diode and from the other end to the circuit common;
a feedback-disabling diode has one electrode connected to said one end of the feedback-enabling resistance and its other electrode connected to another terminal of the DC source; and
said conductive means, for enabling of the feedback circuit connects said other electrode of the feedback-disabling diode to the circuit common.

4. A system as in claim 2 in which a current-limiting resistance is included in the connection from the feedback-enabling resistance to the DC source.

5. A system as in claim 3 in which a current-limiting resistance is included in the connection from the feedback-disabling diode to the DC source.

6. A system as in claim 4 in which bypass capacitance is connected between the circuit common and the junction of the current-limiting and feedback-enabling resistances.

7. A system as in claim 2 in which:
a filter resistance is included in the connection from said other end of the feedback-enabling resistance to the DC source; and
bypass capacitance is connected between the circuit common and the junction of the filter and feedback-enabling resistances.

8. A system as in claim 3 in which:
a blocking diode is included in the connection from said conductive means to the circuit common.

9. A system as in claim 1 in which:
the internal collector-emitter path of a single transistor is common to the feedback paths from the output terminals of two or more later counter stages to the reset terminal of one earlier counter stage.

10. A system as in claim 1 in which:
a single capacitor is common to the feedback circuits from one later stage of the counter to the reset terminals of at least two earlier stages.

11. A system as in claim 1 additionally including:
a motor;
an amplifier having at least one winding of said motor in its output circuitry; and
conductive means operable to apply to the input circuitry of said amplifier the pulses of selectable stages of the counter.

12. A noise-immunizing arrangement for connection between a noisy pulse line and a logic circuit comprising:
a transistor in grounded base configuration having its input and output electrodes respectively connected to said noisy pulse line and to said logic circuit;
low resistance means connected at one end to the junction of said output electrode and said logic circuit and at its other end to a voltage point providing a back-bias for said transistor; and
a diode in the connection from said transistor input electrode to said noisy input line and poled in the same direction of conduction as from said input electrode to said base.

13. A circuit for coupling to an input terminal of a flip-flop comprising in series to said input terminal:
A capacitor;
a diode;
the internal emitter-collector path of a transistor;
a signal input resistor connected between the base of said transistor and the junction of said capacitor and said diode; and low resistance means connected between said input terminal and a voltage point providing a back-bias greater than the threshold of the flip-flop.

14. A system providing for a multiplicity of pulse-repetition frequencies, said system including:

a source of reference frequency pulses;

a series of binary counter stages, the first of which is connected to receive said reference frequency pulses and the remainder of which are connected each to receive the output pulses of the preceding stage;

one or more feedback circuits each effective, when enabled, to reset an earlier one of said stages from output pulses of a later stage and each comprising in series:

a capacitor;

a diode; and the internal collector-emitter path of a transistor having its base connected to circuit common of the counter stages;

an enabling-disabling circuit for each of said feedback circuits;

a motor;

an amplifier having at least one winding of said motor in its output circuitry and a flip-flop stage in the input circuitry;

conductive means operable to apply to the input circuitry of said amplifier the pulses of selective stages of the counter and including in series to an input terminal of the flip-flop:

a capacitor;

a diode; and the collector-emitter path of a transistor having its base connected to the circuit common, and which additionally includes;

resistance means connected between the circuit common and the junction of said capacitor and diode; and resistance means connected between said flip-flops input terminal and a voltage point of the same polarity and magnitude as the voltage source for said flip-flop.

PO-1050
(5/69)

UNITED STATES PATENT OFFICE
CERTIFICATE OF CORRECTION

Patent No. 3,566,230 Dated February 23, 1971

Inventor(s) Samuel J. MacMullan

It is certified that error appears in the above-identified patent and that said Letters Patent are hereby corrected as shown below:

| | |
|---|---|
| Col. 1, line 32, | delete "to the reset", |
| Col. 3, line 41, | "C3,D3,D3,T1" should read --C3, R3,D3,T1--, |
| Col. 4, line 47 | "reset" should read --resets--, |
| Col. 5, line 56, | "FF1-FF2" should read --FF1-FF4--, |
| Col. 5, line 57, | "he" should read --the--, |
| Col. 6, Table 3A, | "FF3.....2 6" should read --FF3.....2 5--; |
| Col. 6, line 14, | "flip-flops" should read --flip-flop--, |
| Col. 8, line 8, | "enclosure 16" should read --enclosure 26--, |
| Col. 8, line 17, | "diodes" should read --diode--, |
| Col. 8, line 32, | "transistor" should read --transistors--, |
| Col. 8, line 43, | "FGIS." should read --FIGS.--, |
| Col. 9, lines 51 and 52, | "configuration; a resistance means; and" should read --configuration, and a resistance means;--, and" after |
| Col. 10, line 73, | "a diode;" should read --a diode; and--. |

Signed and signed this 15th day of February 1972.

(SEAL)
Attest:

EDWARD M.FLETCHER,JR.
Attesting Officer

ROBERT GOTTSCHALK
Commissioner of Patents